US00H002120H

(19) United States
(12) Statutory Invention Registration
Cudlitz

(10) Reg. No.: US H2120 H
(43) Published: Jul. 5, 2005

(54) BIOMETRIC PERSONAL IDENTIFICATION CREDENTIAL SYSTEM (PICS)

(75) Inventor: Stephen Cudlitz, Marblehead, MA (US)

(73) Assignee: The United States of America as represented by the Secretary of the Air Force, Washington, DC (US)

(21) Appl. No.: 10/267,149

(22) Filed: Oct. 10, 2002

(51) Int. Cl.[7] ..... G06K 5/00
(52) U.S. Cl. ..... 235/382
(58) Field of Search ..... 235/380, 382, 235/382.5, 492; 705/13, 18, 44; 340/5.1, 5.2, 5.52, 5.53, 5.6, 5.61, 5.64, 5.65, 5.8, 5.81, 5.82, 5.83, 5.84; 382/115, 116, 117, 118, 124, 127; 713/202, 182; 368/10; 42/70.11; 600/344

(56) References Cited

U.S. PATENT DOCUMENTS

| | | | | | |
|---|---|---|---|---|---|
| 5,222,152 | A | * | 6/1993 | Fishbine et al. | 382/127 |
| 6,111,977 | A | * | 8/2000 | Scott et al. | 382/124 |
| 6,126,078 | A | * | 10/2000 | Locher et al. | 235/492 |
| 6,213,403 | B1 | * | 4/2001 | Bates, III | 235/492 |
| 2002/0138767 | A1 | * | 9/2002 | Hamid et al. | 713/202 |
| 2003/0014642 | A1 | * | 1/2003 | Martinsson et al. | 713/182 |
| 2003/0056122 | A1 | * | 3/2003 | Wuidart | 713/202 |
| 2003/0070343 | A1 | * | 4/2003 | Glock | 42/70.11 |
| 2003/0103414 | A1 | * | 6/2003 | Lyon | 368/10 |
| 2003/0156740 | A1 | * | 8/2003 | Siegel et al. | 382/115 |

FOREIGN PATENT DOCUMENTS

| | | | |
|---|---|---|---|
| GB | 2 156 127 A | * | 10/1985 |
| GB | 2 181 582 A | * | 4/1987 |
| JP | 2002-82914 A | * | 3/2002 |
| JP | 2003-85540 A | * | 3/2003 |
| WO | WO 98/12670 A1 | * | 3/1998 |
| WO | WO 01/54074 A1 | * | 7/2001 |

* cited by examiner

*Primary Examiner*—Daniel T. Pihulic
(74) *Attorney, Agent, or Firm*—William G. Auton

(57) ABSTRACT

This Interactive/Inoperable ID Card is a personal Bio related Positive Identification Credential System (PICS), which due to its nature could only be activated by the individual to whom it was originally issued. The PICS prior to use, would be activated by more than one of the individual's Bio characteristics, (i.e., Breath, perspiration, fingerprint, IR Imaging, DNA, etc.), which would be pre-stored in the PICS Memory for matching identification. The PICS would then be activated for a given length of time so that its Transponder could receive and respond to queries by an RF Reader with specific information stored in the card/memory. The information obtained by the RF Reader would be matched with the computer record which could respond instantly with a positive, personalized clearance, (or rejection), of the carrier. The PICS is positively personal, non-transferable and is subject to being disabled by the RF Reader if the Computer is programed to eliminate that particular card.

5 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BIOMETRIC PERSONAL IDENTIFICATION CREDENTIAL SYSTEM (PICS)

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to systems which control access and more specifically to a multi-factor wireless access control system.

A popular method in automated systems of controlling access is the use of a Personal Identification Number (PIN), which is supposedly known only to the user. The flaws of this "single-factor" approach is that if the PIN becomes known to others, they have access, security is lost. Also a rapid and constant flow of access is not always possible.

There is a need to positively identify all vehicle occupants approaching the gates of Bases or other protected facilities is included in the Draft MNS for an Improved DoD Installation Entry Control Point System. To achieve this capability, at least three functions must be developed. The first is to produce an accurate count of the occupants of a vehicle. Second, a method for making an automatic positive identification of each occupant is required. Third, a constant flow of vehicles and/or personnel is needed to accommodate literally several thousands. Providing authorized personnel with uniquely identifiable vehicle tags and personal credentials that will respond to remote interrogation could product these functions. Integration and instant processing of the information produced by each of these functions in an external data processing system would produce the desired capability. The feasibility of each of these functions must be determined. This invention will develop and demonstrate the Personal Identification Credential System.

A solution to single factor PIC access systems would be an addition of one or more factors. One suitable additional factor would be the wireless biometric verification systems.

Biometric factor technology that is suitable for use in the present invention is disclosed in the following U.S. Patents, the disclosures of which are incorporated herein be reference:

U.S. Pat. No. 6,219,438 issued to Burger.

U.S. Pat. No. 5,878,142 issued to Caputo.

The Burger patent describes a biometric authentication system, which uses stored data with a fingerprint for personnel identification Caputo shows a portable authentication and identification device.

A need remains for a secure, wireless personal credential identifier and access control system. The present invention is intended to satisfy that need.

SUMMARY OF THE INVENTION

The present invention is a wireless multi-factor access control system, a system that can communicate via transceiver when interrogated and will send Encrypted Finger Print to Host Computer for validation and I.D. approval, which can transfer data and information DIN (Digital Identification Number) to the Interrogator. Can be used as a passport, I.D. access control, verification of information at any application in need of knowing positively the I.D., Military I.D., Civilian I.D., etc. All by knowledge in the (data) memory can be acquired with the computer.

This system can communicate data, info and encrypted messages as well as act as a personal credential with biometric capability of the individual. (i.e., iris, retina, DNA image, hand print fingerprint).

The PICS will:

- Provide positive personal identification from a distance of 30 feet (threshold) to 60 feet (goal).
- Use an individual fingerprint for biometric activation of the card/module.
- Have fingerprint data (algorithm Digital Identification Number, DIN) stored in the card and a central database.
- Provide a card activated only by positive identification of the authorized user via authentication of his or her fingerprint. (Biometric) Activation, in this sense, is defined as being able to participate in wireless communications with the controlled perimeter being used as a test bed for the purpose of the demonstration.
- Provide an "on" signal for the period of activation (thus permitting operation of a moving vehicle without distraction) limited to 10 seconds.
- Utilize an open frequency authorized for short-range use.
- Weigh no more than 5 oz (threshold) to 3 oz (goal).
- Consist of dimensions permitting transport in a shirt pocket.
- Be battery operated (threshold) and conveniently rechargeable (goal).
- Be designed for single lane application (threshold), multi-lane application (goal).
- Can be disabled by the computer/interrogator if tampered with or if the owner is delisted.
- Be designed for manufacture with low cost COTS products.
- Have internal space available to ease future integration of related functions (goal).

The invention will be used to make positive identification of an authorized PICS holder. The PICS will not be useable by an imposter. The credential will integrate a fingerprint (or other biometric) sensor, processor, memory, radio link, battery, and GPS receiver (optional) in a credit card form (goal). The PICS will respond to interrogation by a remote reader when activated by the holder's fingerprint. The PICS will be programmable for issue or disablement. The PICS will communicate with the interrogation equipment directly, or through the PICS transceiver. The PICS system will be capable of communicating over a minimum distance of 10 meters threshold, 20 meters is the goal between the vehicle location and the remote reader (interrogator). The system will interact with received vehicle occupancy data from a Vehicle Occupancy Counting System (not a part of this project) and verify that the number of PICS responses corresponds with the number of vehicle occupants. The PICS system will produce an operator alert when the number of PICS responses does not match the vehicle occupant count.

Security Forces Personnel will employ this subsystem in conjunction with other equipment, physical barriers or procedures. Vehicles approaching a controlled gate will be electronically scanned with this subsystem to determine the number of occupants. The occupant count data will be compared with data received from the remotely interrogated credentials or tags. Vehicles successfully meeting system pass criteria will be allowed to proceed. Vehicles failing the criteria will be stopped and manually processed by the guard. The intent is to expedite the flow of vehicle traffic with automatic processing, while allowing the guards to handle exceptions.

It is an object of the invention to provide an automated access control system, which uses multiple factors to verify identify.

It is another object of the invention to develop a wireless process for authentication of personal identification.

These and many other objects and advantages of the present invention will be readily apparent to one skilled in the pertinent art from the following detailed description of a preferred embodiment of the invention and the related drawings.

DETAILED DESCRIPTION OF EMBODIMENTS OF THE INVENTION

Figure 1:
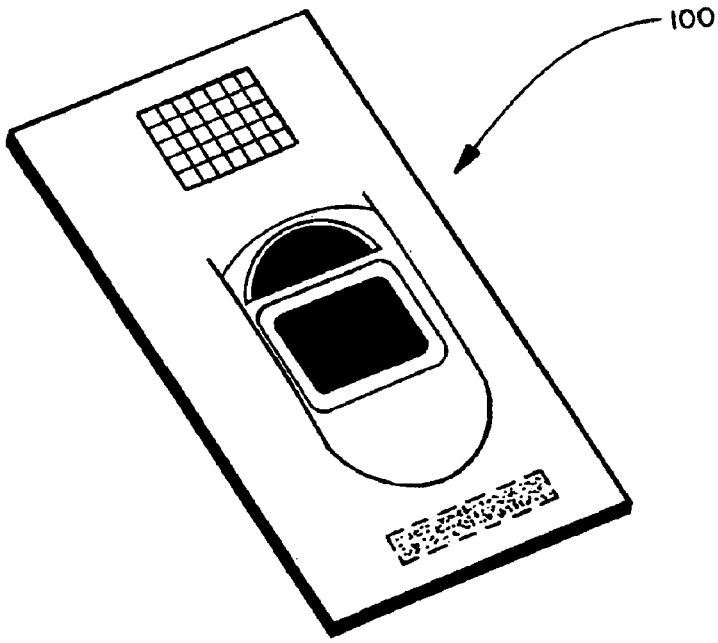
FIG. 1 is an illustration of the present invention.

FIG. 1 is an illustration of the preferred embodiment of the present Invention, which is a personnel authentication system.

This Interactive/Interoperable ID Module Is a Bio related personal Identification Credentials (PICS), which due to its nature, could only be activated by the individual to whom it was originally issued.

The PICS, prior to use, could be activated by more than one of the individual's Bio characteristics, (i.e., Fingerprint, Iris, Image, DNA, Retina, etc.), which DIN (Digital Identification Number) would be pre-stored in the PICS memory for matching identification.

The PICS would be activated for a given length of time so that it's transceiver could respond and receive queries by an RF Reader for selected specific information stored in the PICS memory.

This information obtained by the RF reader would be compared with the computer data and respond instantly with a positive, personalized clearance (or rejection) of the bearer.

The PICS is positive credential, personal, non-transferable and could be subject to being disabled if programmed for this action.

The PICS is to be able to be contacted by the RF reader while in the pocket of the individual at a range of 10 meters threshold 20 meters (goal).

This Interactive/Interoperable ID Card Module would be a personal Bio related Positive Identification Credential System (PICS) which due to its nature could only be activated by the individual to whom it was originally issued. The PICS, prior to use, would be activated by more than one of the individual's Bio characteristics, (i.e., breath, perspiration, fingerprint, IR imaging, DNA, etc), which would be pre-stored in the PICS memory for matching identification. The PICS would then be activated for a given length of time so that it's Transponder could receive and respond to queries by an RF Reader with specific information stored in the card memory. The information obtained by the RF Reader would be matched with the computer record which could respond instantly with a positive, personalized clearance, (or rejection), of the carrier. The PICS is positively personal, non-transferable and is subject to being disabled by the RF Reader if the Computer is programmed to eliminate that particular card. The PICS is to be able to be contacted by the RF Reader while it is in the wallet of the individual.

With the availability of Solid State MEMS and IC's a GPS capability could be added which would also allow the PICS on the person, to be locatable and trackable. Ultra thin batteries are in use and available as are the chip sets and the "Credit Card", technologies to make this a reality as a COTS product.

The face size of this card should have a face size so that it can be carried in a pocket.

FIG. 1 is a drawing of what the PICS module looks like. It is thicker than a credit card to include a battery and has an external fingerprint chip as discussed below.

Figure 2:
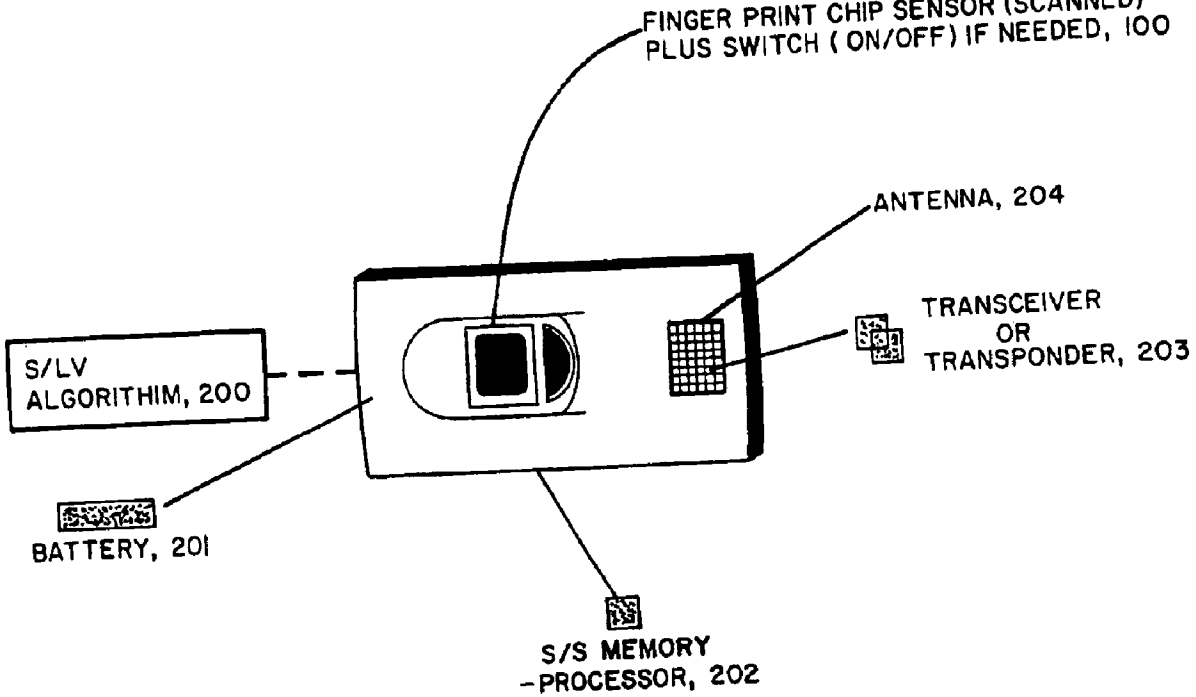
FIG. 2–7 are examples of the invention

FIG. 2 is an illustration of the elements of a complete PICS system. The fingerprint sensor used is the Veridicom fingerprint reader produced by:

Veridicom
2040 Martin Avenue, Santa Clara CA 95050
tel 408.565-6000 fax 408.565-6020
email: info@veridicom.com
www.veridicom.com This is all mounted on the Veridicom plastic body, which has the universal serial bus for chip installation.

The PICS is approximately the size of a credit card module that uses the COTS of Table 1:

TABLE 1

| COTS Components |
|---|
| Fingerprint Sensor (Biometric) |
| Semiconductor 'Chips' as a Micro-Computer set containing adequate Memory (RAM & ROM), Processor & I/O Capability to interoperate with existing access system, (i.e., easy pass gate system, and other applications requiring positive identification) |
| Transceiver (wireless link to any interrogator/reader) |
| Omni Directional Antenna |
| Battery (>2+ Yrs Life, or recharge capability) |
| Software & Algorithm (DIN Generation) |
| With available internal real estate for other 'Chip' Functions (i.e., GPS Chip Set, Frequency Generator) |
| Positive Identification Credential System (PICS) |
| The PICS will: |
| Be a not-counterfitable "Positive Identification Credential System," (PICS), adaptable to Applications requiring a personal Bio-ID |
| Provide a wireless capability for a PICS from a distance of 10 meters threshold 20 meters (goal). |
| Be capable of being "read" while in the pocket of the bearer in a vehicle moving at highway speeds and many other applications |
| Be capable of being activated by one or more biometrics such as Fingerprint, Iris, Retina, Image, (IR or Visible) or DNA features which can have it's DIN, (Digital Identification Number), stored in the memory. |
| Have a memory capability to store all of the above plus other personal data that may be required to be a positive "Credential" |
| Have the capability to transmit all data to a Central Data Bank |
| Be rechargeable battery operated |
| Have an Omni Directional Antenna and use an open frequency authorized for short-range use. |
| Be a producible design using low cost "COTS" Products |
| Weigh 5 Oz and fit in a shirt pocket |
| Be simple to use with the complexity buried in the design |
| Have the outside faces available for visible information |

PICS activation can occur from a low threshold, which could be on at all times or after an On/Off Switch activates the threshold. The selected finger is placed on the fingerprint sensor for activation to create the DIN by the Algorithm. The PICS remains on for a short time (~10 Secs) during which it transmits the DIN by wireless link to the reader/interrogator and the central data bank for use in the authentication process. While PICS is on the SAN could be programmed to selectively delete all or selective information from the PICS or disable it. Once confidence has been established in the reliability of PICS it has the potential of being considered as a stand-alone credential in many applications. Initial Enrollment is as follows:

In the presence of the issuer the bearer inserts the PICS into a reader/encoder, which captures the fingerprint Biometric as a digital identification number (DIN) in the host computer and the PICS memory simultaneously. If additional Encryption beyond the Algorithm is required, it can be accomplished during the above activity. The Reader/Encoder can also be used to include other Biometrics as a DIN for use as back-up or additional information. A Digitized Image of the user can also be taken and stored in the PICS and/or the Host Computer. The PICS is now the positive credential of the enrolled bearer, which can only be activated by the bearer's fingerprint (or other selected Biometric).

In operation the invention will provide positive access control at restricted perimeters. The PICS provides a positive, personal biometric measurement and serial number. The serial number, unique to the individual, should be machine-readable utilizing a wireless transmission. The identification data is transmittable by a transponder over a distance of up to 10 meters feet threshold, 20 meters feet objective. The PICS should provide an all weather capability.

Figure 3:
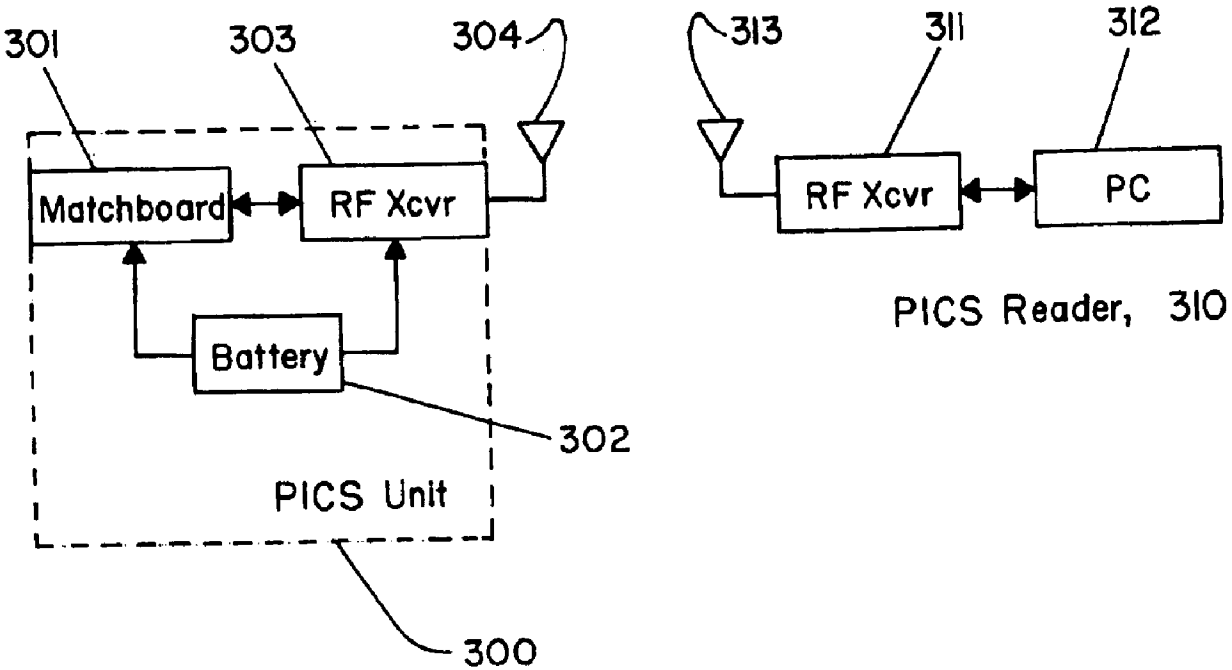

PICS interacts with a system PICS reader as shown in FIG. 3.

The PICS unit 300 was the PC and fingerprint reader on the matchboard 301 and transceiver 303 to send out the digital identification number from the antenna 304 to the PICS reader antenna 313 where it is compared to stored numbers on the reader PC 312.

Figure 4:
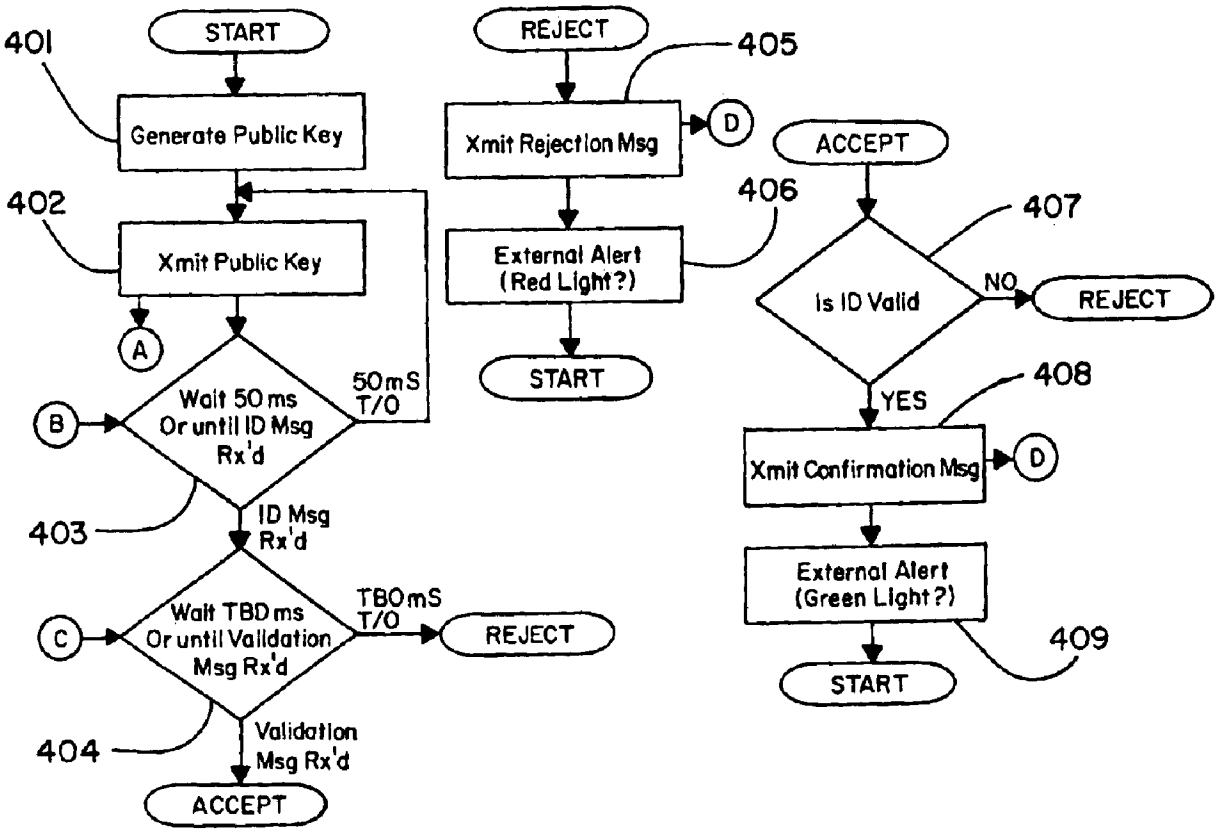

FIG. 4 shows a day in the life of a PICS reader.

PICS Reader Description

The PICS Reader will be an embedded PC running a real-time operating system. The PICS Reader will maintain a local copy of the database for fast access. The RF interface will consist of separate transmitters and receivers (including separate antennas) for full duplex operation. The number of transmitters and receivers will depend on the final configuration (not necessarily the same number of each). Transmitter antennas could be highly directional.

Figure 5:
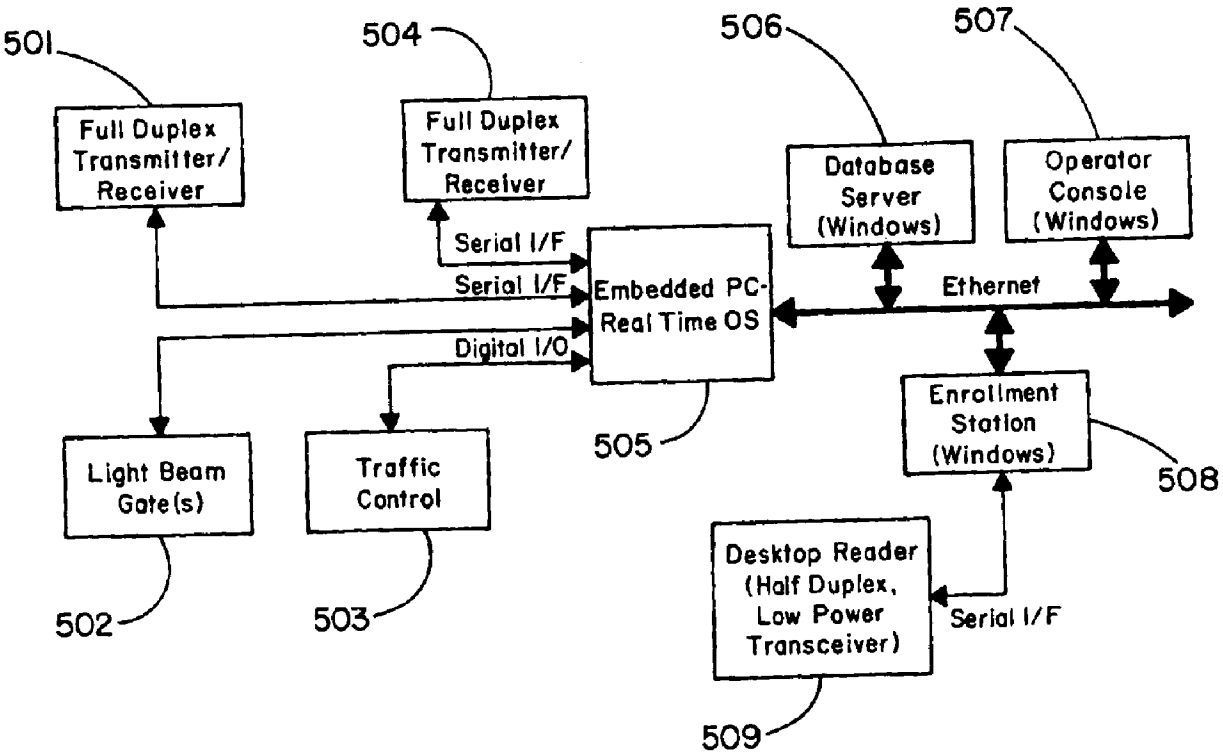

FIG. 5 is a PICS reader block diagram.

Figure 6:
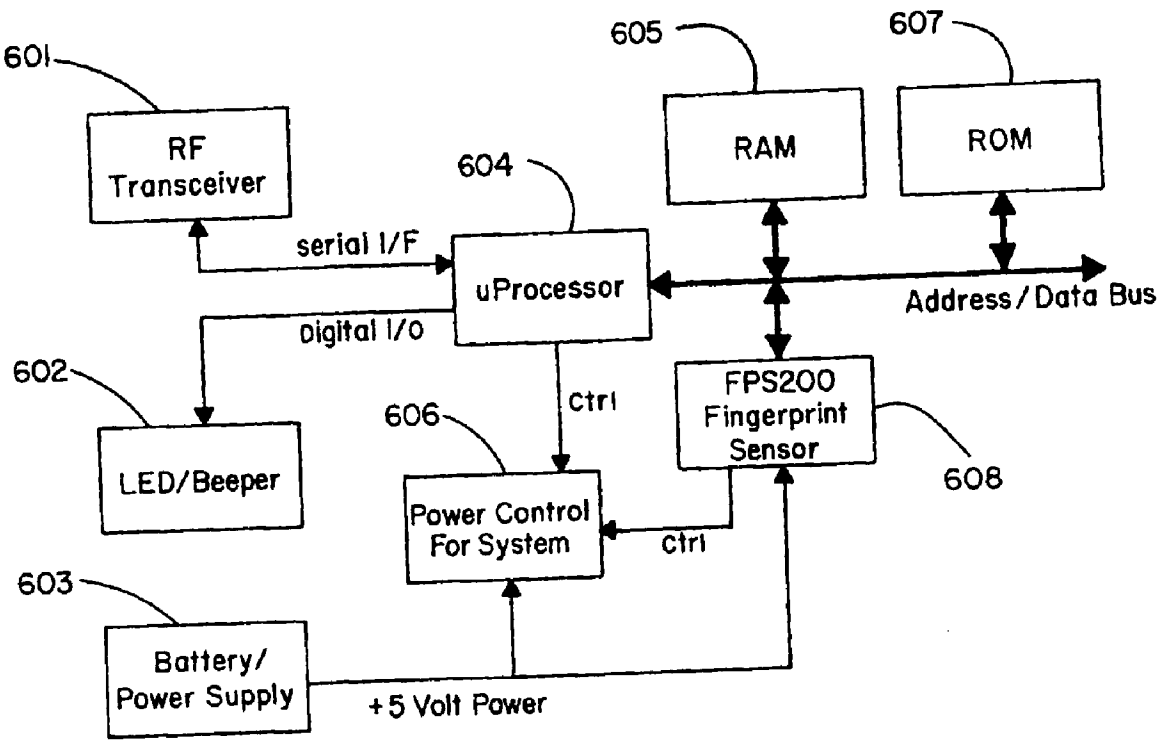

FIG. 6 is a more detailed PICS unit block diagram.

PICS Unit Operation

PICS Unit remains (or have an ON/OFF switch) in standby until user activates. PICS Unit verifies the fingerprint (or fails the verification) and alerts user. Once the fingerprint is verified, the RF module is activated to look for interrogation message from Reader. Immediate, encrypted DIN message sent to the Reader. Reader sends to Host Computer for comparison validation. PICS Unit shuts down.

PICS Unit Description

Biometric Sensor will be COTS Veridicom FPS200 fingerprint sensor. RF communication will use a COTS LINX SC series transceiver or equivalent. Unit could run up to a year with 9 Volt battery, depending on frequency of use. Unit can include audio or visual feedback for minimal attention required by user. All COTS/Parts can be upgraded as technology advances. Responses will include:

Valid/Invalid fingerprint

System accept/reject confirmation

Low battery

Figure 7:
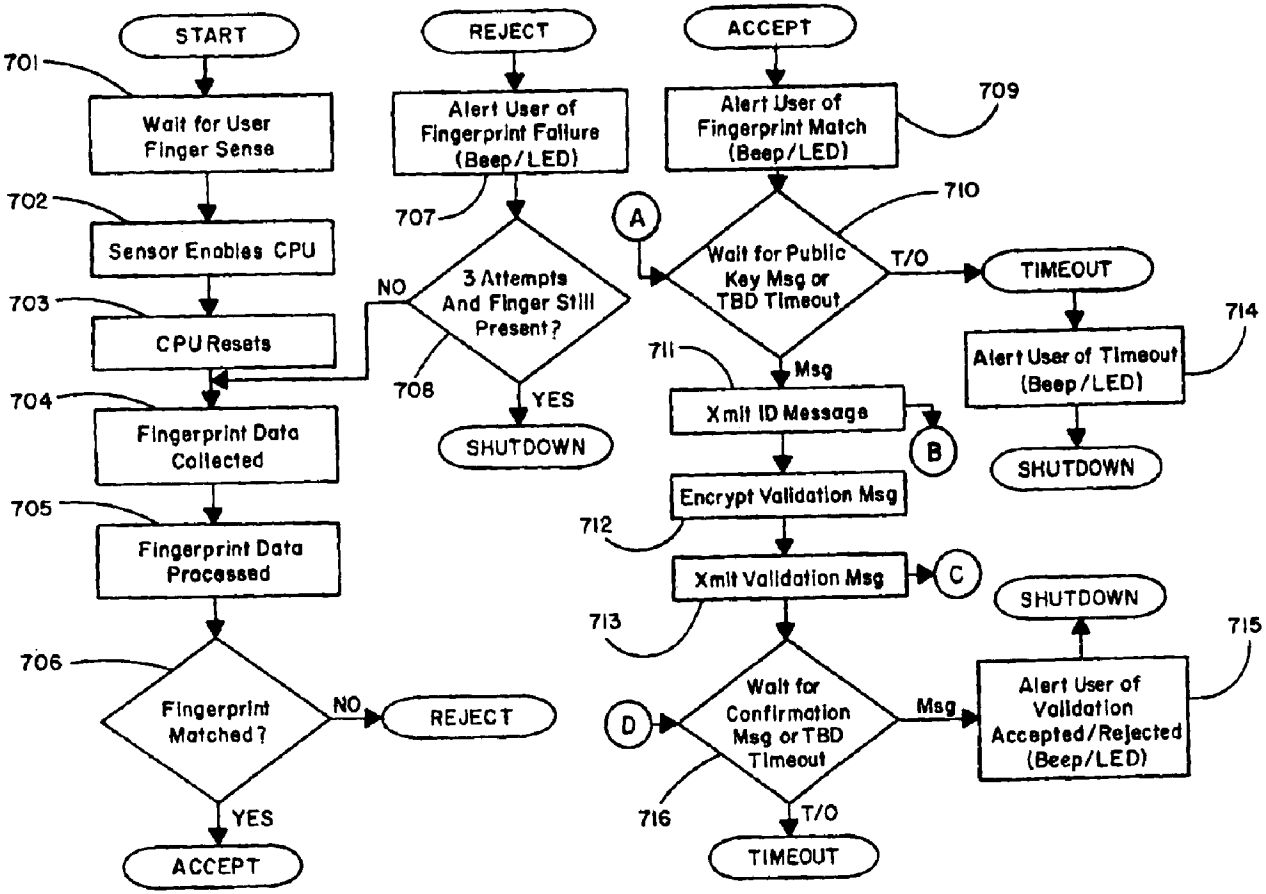

FIG. 7 is a flow diagram of a day in the life of a PICS ID Unit System Operation.

User activates PICS Unit when user enters the interrogation field where the fingerprint is approved. Reader repeatedly sends interrogation message that the PICS Unit receives as it enters the interrogation field. PICS Unit responds with DIN message, and transmits it to the Reader. Reader verifies message and sends a confirmation to the PICS Unit and to an access system for action. PICS Unit alerts user and then shuts down. Light beam "gates" and traffic control lights are used to insure only one vehicle in field at one time (number and locations depends on how well the interrogation field is contained). Light beam "gates" and traffic control lights are used to insure only one vehicle in field at one time (number and locations depends on how well the interrogation field is contained). Each user will be gated into the Interrogation Field when the field is empty or the current user has already established contact (as soon as Unit ID message is received by the Reader). Feedback to system operator (guard) via traffic control lights, horn, operator station (PC). Field lengths may vary depending on several factors:

Fingerprint verification time (in PICS Unit),

Communication time requirements (baud rate, message length, processing time),

How well the Reader RF field is contained,

Vehicle size, spacing, and speed requirements.

While the invention has been described in its presently preferred embodiment, it is understood that the words which have been used are words of description rather than words of limitation, and that the claims may be made without departing from the scope and spirit of the invention in its broader aspects.

What is claimed is:

1. A wireless personal identification credential system for use with a wireless receiver which contains a stored set of digital identification numbers of authorized personnel, and which comprises:

a means for transmitting a wireless biometric digital identification number to said wireless receiver;

a biometric scanner which produces an output signal by sensoring a biometric feature of a user; and a central processing unit with stored biometric feature data correlated with digital identification numbers and which outputs a specific digital identification number to said transmitting means for transmission when receiving the output signal from said biometric scanner which correlates with one of the entries of stored biometric feature data.

2. A wireless personal identification credential system, as defined in claim 1, wherein said biometric scanner comprises a biometric sensor that detects characteristics selected from a list of features comprising; fingerprints, DNA, retina features, face recognition, voice recognition and IR imaging.

3. A wireless personal identification credential system, as defined in claim 2, wherein said biometric scanner comprises a fingerprint scanner.

4. A wireless personal identification credential system, as defined in claim 1, wherein said transmitting means comprises:

a transceiving antenna, and a transceiver, which conducts the digital identification number from the central processing unit to the transceiving antenna for broadcast when the biometric scanner is activated.

5. A wireless personal identification credential system, as defined in claim 3, wherein said transmitting means comprises:

a transceiving antenna, and a transceiver which conducts the digital identification number from the central processing unit to the transceiving antenna for broadcast when the biometric scanner is activated.

* * * * *